Patented Jan. 4, 1944

2,338,252

UNITED STATES PATENT OFFICE 2,338,252

DECORATING COMPOSITION FOR TEXTILES

Carl M. Marberg, Elmhurst, N. Y., and John Abrams, Jersey City, N. J., assignors to Interchemical Corporation, New York, N. Y., a corporation of Ohio No Drawing. Application October 18, 1941, Serial No. 415,630

2 Claims. (Cl. 260—29)

This invention is in the field of textile printing, in particular of pigment printing. It provides a new type of pigment printing paste containing as the pigment binder modified polyvinyl alcohol, the pastes being specially compounded to provide satisfactory printing properties.

Conventional textile printing has ordinarily been done with water solutions of dyestuffs containing water-soluble thickening agents in sufficient quantity to retard the spreading of the color on the fabric after printing. The dyestuff is fixed on to the fabric by some chemical process, and the thickening agent is then washed out of the fabric. The time and expense involved in this after-treatment, added to the originally high color cost for light and tub-fast dyes, has been a major problem in textile printing. An unsolved problem has been the reproduction of very fine designs. Since the pastes spread on the fabric after printing when thin enough to be removed sharply from fine engravings, giving blurred designs, it has been found impossible to use photogravure cylinders or extremely fine mill and die engravings. Attempts to modify these pastes by addition of wetting agents and emulsification of oils therein have not solved the basic difficulties.

In order to overcome the difficulty with the use of dyestuffs, it has long been proposed to use insoluble pigments in printing pastes. Albumen and other water-dispersible thickeners have been used to bind the pigment to the fabric, the albumen being set by heat so as to become insoluble in water. The resultant prints, however, will not withstand laundering; and the same printing difficulties are encountered as with dyestuff pastes.

It was also proposed, at an early date, to use ordinary oil base printing inks and colored lacquers in the decoration of fabrics; these compositions were never satisfactory as a general replacement for dyestuff printing pastes, for a variety of reasons. Relatively few binders useful in printing inks and lacquers withstand both dry cleaning and washing; and such compositions as are resistant have been generally unacceptable due to the fact that the fabrics, when printed with these lacquers, develop an undesirable stiff feel (known to the trade as "hand"), to the necessity for using large amounts of color to obtain deep shades, and to the tendency of colored markings to rub off on to other clothing and leave a mark (known as "crocking").

There has recently appeared on the market a new type of pigmented textile printing paste which has been successful as a replacement for the old type dyestuff printing paste. These pastes are described in the Jenett U. S. Patent No. 2,222,581, issued November 19, 1940; and they are emulsions in which an outer continuous water-immiscible-lacquer phase is thickened by an inner aqueous phase which is at least 20 per cent. of the total emulsion, by weight. Preferably, the binder of the lacquer is one which is originally soluble in ordinary organic solvents and which can be converted into an insoluble state after printing—most desirably, a readily heat-polymerizable synthetic resin, best exemplified by the plasticized urea formaldehyde resins. These pastes have not only overcome the problem of "hand" and "crocking," as relates to pigment printing, but have introduced new printing standards into the industry, because of their marked superiority in printing properties as compared to the conventional aqueous systems.

The industry has, however, one objection to these new pastes; their use of a continuous hydrophobe phase introduces new problems into an industry that is accustomed to handling water-miscible materials. Hence, the successful introduction of these pastes has served to intensify the search for the long sought for wash-fast "albumen," and to raise the standards of wash-fastness and printing qualities, which the new product must have.

Among the water-dispersible products previously suggested for pigment printing, and which are somewhat superior to albumen in wash-fastness, are certain cellulose ethers and hydroxy ethers, water-soluble urea formaldehyde resins which are set by heat on the fabric, and polyvinyl alcohols, which are printed with formaldehyde or dimethylol urea, and insolubilized by reaction between the ingredients induced by heat. None of these products, however, has been used with complete success in pigment printing, for two reasons—their printing properties are poor, particularly in that they do not utilize the full color value of the pigments used with them, and their wash-fastness, while considerably better than albumen, leaves much to be desired.

We have discovered that the wash-resistance of polyvinyl alcohol pastes may be considerably increased by the use of carbamide-formaldehyde condensates polymerized to a resinous state, protecting the compositions from gelation by the use of nitrogenous bases volatile at drying temperatures, added in sufficient quantity so that the water in the composition is neutral or slightly alkaline in reaction.

These resinous condensates are superior to dimethylol urea in their ability to increase the wash-resistance of polyvinyl alcohol prints, but they tend to gel rapidly on storage of the prints, due to the normal acidity prevalent therein. By using volatile nitrogenous bases, neutrality is maintained on storage, but acidity is regained on exposure of the prints to heat; complete reaction and setting thus occur in a normal length of time.

The carbamide-formaldehyde resin may be used in aqueous solution; most preferably it is dissolved in an organic liquid and emulsified into the paste. In this form, markedly improved color value is obtained.

Typical nitrogenous bases, volatilizable at drying temperatures, include ammonia, morpholine, pyridine, the ethanolamines, etc. About one-twentieth of 1%, based on the total composition, is ordinarily sufficient to prevent gelation, although the amount obviously varies with the particular paste. More may be added, of course, as desired.

While our new products are particularly useful for pigment printing of textiles, they may also be used for pigment dyeing, by forcing the thickened composition through the fabric, in the manner described in the Cassel U. S. Patent No. 2,248,696, issued July 8, 1941.

Typical examples of our invention are the following:

Example 1

| | Grams |
|---|---|
| Polyvinyl alcohol (E. I. du Pont de Nemours and Company—PVA 403)—10% aqueous solution | 30.0 |
| Tributyl phosphate | 1.0 |
| Monastral Green G (copper chlor phthalocyanine) (20% aqueous pulp) | 30.0 |
| Water, containing | 44.5 |
| Morpholine | 0.5 |
| Solvent-soluble urea formaldehyde resin, 50%, in butanol-xylene (50/50) | 14.0 |
| Alkyd resin, 50% solution in pine oil—Solvesso #2 (30/70) | 40.0 |
| Pine oil | 11.0 |
| Solvesso #2 (hydrogenated petroleum naphtha) | 25.0 |

The first five constituents were mixed, and to them, with rapid stirring, was added a mixture of the remaining constituents. The resulting lacquer-in-water emulsion ink gave excellent prints of good fastness and color value on being set by heating for three minutes at 150° C.

Example 2

| | Grams |
|---|---|
| Polyvinyl alcohol (PVA 403)—10% aqueous solution | 80.0 |
| 50% aqueous solution Ciba melamine-formaldehyde resin | 8.0 |
| Heliogen Blue, 22% aqueous pulp | 9.0 |
| Water | 33.0 |
| Sunoco spirits (turpentine substitute petroleum naphtha) | 69.5 |
| Concentrated aqua ammonia | .5 |

The aqueous constituents were mixed, and to them the mineral spirits were slowly added with stirring. Results were similar to Example 1.

Example 3

| | Grams |
|---|---|
| Polyvinyl alcohol (PVA 403)—10% aqueous solution | 100.0 |
| Ciba water-soluble melamine-formaldehyde resin | 4.0 |
| Tributyl phosphate | 1.0 |
| Keltex (potassium alginate) | 1.0 |
| Monastral Green G, 20% aqueous pulp | 20.0 |
| Water | 73.5 |
| Pyridine | 0.5 |

The Keltex was dissolved in the heated water, and the rest of the ingredients were then added with good stirring. Prints of good washfastness resulted.

Examples can of course be multiplied indefinitely without departing from the scope of the invention as defined in the claims. Thus, various wash-fast pigments may be used; the carbamide-formaldehyde resin may be made from any of the various derivatives and equivalents of urea—e. g. thiourea, biuret, dicyandiamide, melamine, other amino-triazenes, etc. Any of the volatile nitrogenous bases may be used; it is only essential that they be volatilizable with some speed at the drying temperatures to be employed—e. g., 150° C.

We claim:

1. A textile decorating composition comprising a pigment dispersed in a mixture of polyvinyl alcohol solution and carbamide-formaldehyde resin, which mixture will gel on storage, and sufficient of a nitrogenous base, volatilizable from a thin film of the composition in a relatively few minutes at 150° C., to inhibit gelation.

2. A textile decorating composition comprising a pigment dispersed in an emulsion of an aqueous polyvinyl alcohol solution and a solution in water-immiscible organic solvents of a solvent-soluble carbamide-formaldehyde resin, which emulsion will gel on storage, and sufficient of a nitrogenous base, volatilizable from a thin film of the composition in a relatively few minutes at 150° C., to inhibit gelation.

CARL M. MARBERG.
JOHN ABRAMS.